(12) United States Patent
Fukuda

(10) Patent No.: US 11,341,680 B2
(45) Date of Patent: May 24, 2022

(54) GAZE POINT ESTIMATION PROCESSING APPARATUS, GAZE POINT ESTIMATION MODEL GENERATION APPARATUS, GAZE POINT ESTIMATION PROCESSING SYSTEM, AND GAZE POINT ESTIMATION PROCESSING METHOD

(71) Applicant: Preferred Networks, Inc., Tokyo-to (JP)

(72) Inventor: Masaaki Fukuda, Tokyo-to (JP)

(73) Assignee: PREFERRED NETWORKS, INC., Tokyo-To (JP)

( * ) Notice: Subject to any disclaimer, the term of this patent is extended or adjusted under 35 U.S.C. 154(b) by 0 days.

(21) Appl. No.: 16/370,528

(22) Filed: Mar. 29, 2019

(65) Prior Publication Data
US 2019/0304136 A1 Oct. 3, 2019

(30) Foreign Application Priority Data

Mar. 30, 2018 (JP) .............................. JP2018-068120

(51) Int. Cl.
*G06K 9/00* (2006.01)
*G06T 7/73* (2017.01)
(Continued)

(52) U.S. Cl.
CPC ................ *G06T 7/75* (2017.01); *G06T 7/269* (2017.01); *H04N 5/23219* (2013.01);
(Continued)

(58) Field of Classification Search
CPC . G06T 7/75; G06T 7/269; G06T 2207/20081; G06T 2207/20084; G06T 2207/30201; H04N 5/23219
(Continued)

(56) References Cited

U.S. PATENT DOCUMENTS 8,885,882 B1\* 11/2014 Yin .................... G06K 9/00248
382/103
9,891,707 B2 2/2018 Imoto et al.
(Continued)

FOREIGN PATENT DOCUMENTS

JP 2015-085719 A 5/2015
JP 2016-515242 A 5/2016
(Continued)

OTHER PUBLICATIONS

"FOVE: The World's First Eye Tracking Virtual Reality Headset," Available online, URL: <https://kickstarter.com/projects/fove/fove-the-worlds-first-eye-tracking-virtualreality?lang=ja> (Dec. 2016).
(Continued)

*Primary Examiner* — Gabriel I Garcia
(74) *Attorney, Agent, or Firm* — Foley & Lardner LLP

(57) ABSTRACT

A gaze point estimation processing apparatus in an embodiment includes a storage configured to store a neural network as a gaze point estimation model and one or more processors. The storage stores a gaze point estimation model generated through learning based on an image for learning and information relating to a first gaze point for the image for learning. The one or more processors estimate information relating to a second gaze point with respect to an image for estimation from the image for estimation using the gaze point estimation model.

20 Claims, 13 Drawing Sheets

(51) Int. Cl.
  *G06T 7/269* (2017.01)
  *H04N 5/232* (2006.01)
(52) U.S. Cl.
  CPC ............... *G06T 2207/20081* (2013.01); *G06T 2207/20084* (2013.01); *G06T 2207/30201* (2013.01)
(58) Field of Classification Search
  USPC ......................................................... 382/103
  See application file for complete search history.

(56) References Cited

U.S. PATENT DOCUMENTS

| | | | |
|---|---|---|---|
| 9,965,860 B2 | 5/2018 | Nguyen et al. | |
| 2003/0218672 A1* | 11/2003 | Zhang ..................... | H04N 7/15 348/14.16 |
| 2004/0174496 A1* | 9/2004 | Ji ........................... | G06F 3/013 351/209 |
| 2015/0278599 A1* | 10/2015 | Zhang ..................... | G06T 7/80 348/78 |
| 2016/0005176 A1 | 1/2016 | Nguyen et al. | |
| 2016/0239081 A1 | 8/2016 | Imoto et al. | |
| 2017/0031437 A1* | 2/2017 | Qian ....................... | G06T 7/277 |
| 2018/0232928 A1* | 8/2018 | Grant ...................... | G06F 3/013 |
| 2019/0324528 A1* | 10/2019 | Williams ............ | G06K 9/00375 |

FOREIGN PATENT DOCUMENTS

| | | |
|---|---|---|
| JP | 6187155 B2 | 8/2017 |
| JP | 2017-215963 A | 12/2017 |
| WO | WO-2015/064165 A1 | 5/2015 |
| WO | WO-2016/018487 A9 | 2/2016 |

OTHER PUBLICATIONS

"Go beyond voice with the most intuitive interaction available," Available online, URL: <https://www.nuance.com/automotive/multimodal-interaction.html> (2019 copyright).

"Mutlimodal interaction—How machines learn to understand pointing," Available online, URL: <https://whatsnext.nuance.com/connected-living/speech-gesture-handwriting-multimodal-interaction-with-smart-automotive-assistant/> (Jan. 24, 2018).

"Tobii Pro Glasses 2", Tobii Pro, Available online, URL: <https://www.tobiipro.com/product-listing/tobii-pro-glasses-2/>.

Isola et al., "Image-to-Image Translation with Conditional Adversarial Networks," Berkeley Al Research (BAIR) Laboratory, University of California (Nov. 21, 2016), Available online URL: <https://arxiv.org/pdf/1611.07004.pdf>.

Sugano et al., "Sensing of a look," vol. 64, No. 12, pp. 1797-1800 (2010).

Kar-Han Tan et al., "Appearance-based Eye Gaze Estimation," 5 pages (Dec. 2002).

Roberto Valenti et al., "What Are You Looking at? Improving Visual Gaze Estimation by Saliency", Received: Aug. 6, 2010 /Accepted: Nov. 28, 2011 / Published online: Dec. 17, 2011 (11 pages).

Yusuke Sugano et al., "Calibration-free gaze sensing using saliency maps" pp. 1-8 (Jan. 2010).

FOVE Eye tracking vr devkit, Available online, URL: https://web.archive.org/web/20180304091003/https://www.getfove.com/ [Retrieved on Jun. 21, 2021].

Insta VR-transcosmos Inc., Available online, URL: https://cdn.instavr.co/download/InstaVR-transcosmos-Use-Case.pdf [Retrieved on Jun. 21, 2021].

Yusuke Sugano "Line-of-sight estimation by machine learning and its real-world application" Graduate School of Information Science and Technology, Osaka University, Available online, URL: https://ibisml.org/archive/ibis2017/IBIS2017_sugano.pdf [Retrieved on Nov. 10, 2017].

Dragon Drive by Nuance Provides Automakers with voice interaction at the edge. (Jan. 17, 2018) Available online, URL: https://voicebot.ai/2018/01/17/dragon-drive-nuance-provides-automakers-voice-interaction-edge/.

http://news.nicovideo.ip/watch/nw3238662 (last known ~ Jan. 2018).

Yusuke Sugano "Line-of-sight estimation by machine learning and its real-world application" Graduate School of Information Science and Technology, Osaka University. Available online, URL: https://ibisml.org/archive/ibis2017/IBIS2017_sugano.pdf (Presentation dated Nov. 10, 2017, held at The 20$^{th}$ Information-Based Induction Sciences Workshop (IBIS2017), at the University of Tokyo on Nov. 8-11, 2017.).

Tilke Judd et al., "Learning to Predict Where Humans Look," 2009 IEEE 12th International Conference on Computer Vision (ICCV) pp. 2106-2113 (Sep. 29, 2009).

Takashi Watanabe et al., "Autonomous Foveating System Based on the Pulse-Coupled Neural Network with Sigmoidal Pulse Generator," Transactions of the Society of Instrument and Control Engineers, vol. 38, No. 8, pp. 726-732 (Aug. 31, 2002).

\* cited by examiner

GAZE POINT ESTIMATION PROCESSING APPARATUS, GAZE POINT ESTIMATION MODEL GENERATION APPARATUS, GAZE POINT ESTIMATION PROCESSING SYSTEM, AND GAZE POINT ESTIMATION PROCESSING METHOD

CROSS-REFERENCE TO RELATED APPLICATION

This application claims the benefit of priority to Japanese Patent Application No. 2018-068120, filed Mar. 30, 2018, the entire contents of which are incorporated herein by reference.

FIELD

Embodiments described herein relate generally to a gaze point estimation processing apparatus, a gaze point estimation model generation apparatus, a gaze point estimation processing system, a gaze point estimation processing method, a non-transitory computer readable medium, and a gaze point estimation model.

BACKGROUND

Development of a technique of performing eye tracking using a plurality of cameras and estimating a gaze point of a subject of eye tracking has been advanced. If it is possible to recognize the gaze point of the subject, it is possible to provide service of providing information relating to an object the subject is gazing at.

However, eye tracking systems may require a plurality of apparatuses for collecting position information of feature points of the subject to estimate the gaze point of the subject. For example, a camera which photographs eyes, a camera which detects orientation of the head, an apparatus which measures a distance between the eyes of the subject and a reference point, or the like, may be required in eye tracking systems. Therefore, the gaze point can be calculated only in an environment where the apparatuses are provided. Further, in the case where the subject is moving, estimation accuracy through eye tracking degrades when the subject blends into the crowd, or the like.

DETAILED DESCRIPTION

In an environment where it is difficult to perform eye tracking, it is difficult to estimate a gaze point of a person and provide service based on the estimated gaze point.

A gaze point estimation processing apparatus according to an embodiment of the present disclosure may include a storage configured to store a gaze point estimation model and one or more processors. The storage may store a gaze point estimation model generated through learning based on an image for learning and information relating to a first gaze point for the image for learning. The one or more processors may estimate information relating to a second gaze point with respect to an image for estimation from the image for estimation using the gaze point estimation model.

Below, a description is given of embodiments of the present disclosure with reference to the drawings. The present disclosure is not limited to the embodiments.

First Embodiment

Figure 1:
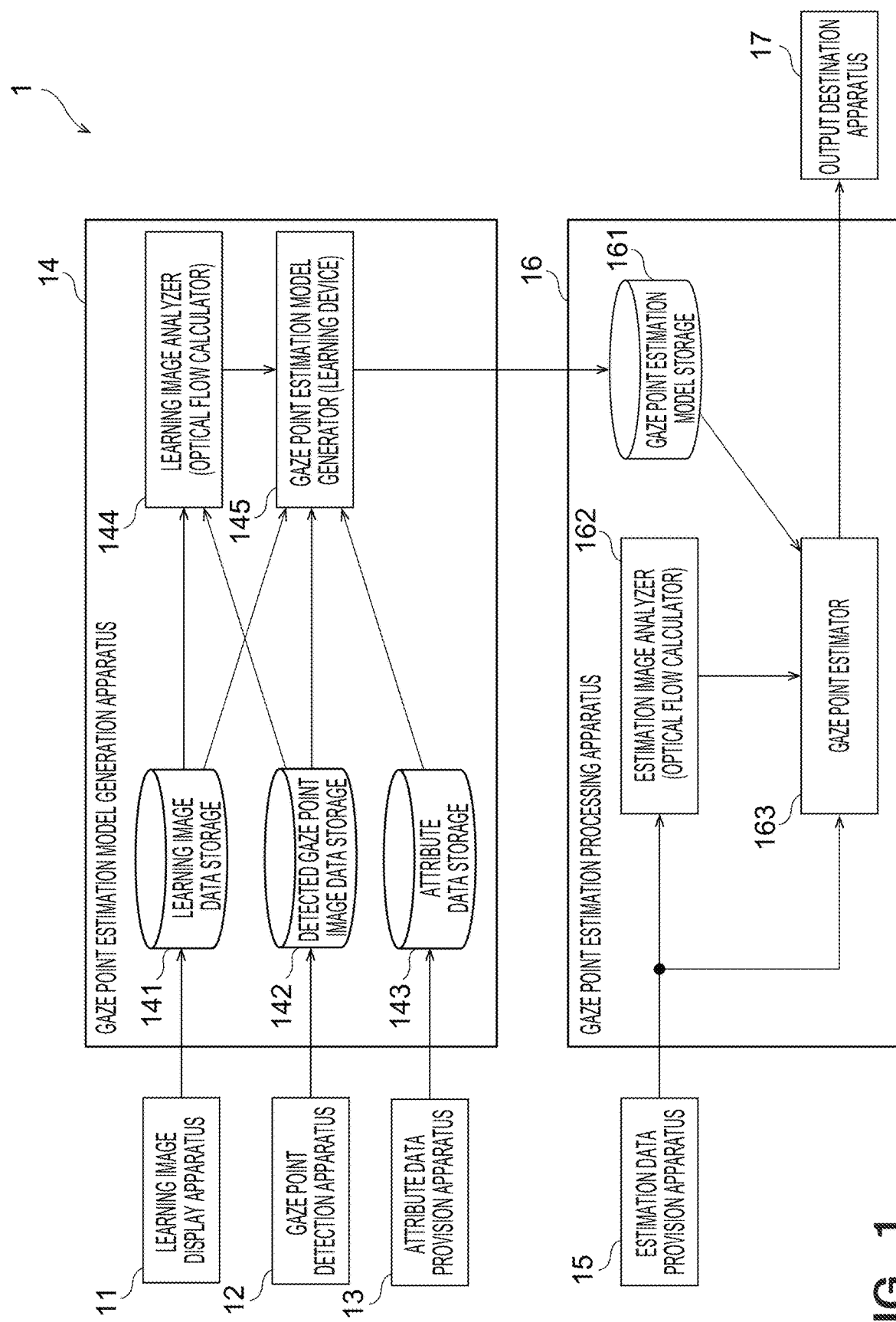
FIG. 1 is a block diagram illustrating an example of a gaze point estimation processing system according to a first embodiment.

FIG. 1 is a block diagram illustrating an example of a gaze point estimation processing system according to a first embodiment. The gaze point estimation processing system 1 illustrated in FIG. 1 includes a learning image display apparatus 11, a gaze point detection apparatus 12, an attribute data provision apparatus 13, a gaze point estimation model generation apparatus 14, an estimation data provision apparatus 15, a gaze point estimation processing apparatus 16 and an output destination apparatus 17. The gaze point estimation model generation apparatus 14 includes a learning image data storage 141, a detected gaze point image data storage 142, an attribute data storage 143, a learning image analyzer (optical flow calculator) 144 and a gaze point estimation model generator (learning device) 145. The gaze point estimation processing apparatus 16 includes a gaze point estimation model storage 161, an estimation image analyzer (optical flow calculator) 162 and a gaze point estimator 163.

The gaze point estimation processing system according to the first embodiment is a system which, when an image is input from the estimation data provision apparatus 15, estimates a gaze point within the image estimated to be gazed by a viewer who views the image and outputs information relating to the gaze point. Specifically, first, the gaze point estimation model generation apparatus 14 generates a gaze point estimation model for estimating the gaze point through deep learning. Then, the gaze point estimation processing apparatus 16 estimates the gaze point from the image input from the estimation data provision apparatus 15 using the gaze point estimation model. Details of the processing will be described with each apparatus and each component.

Incidentally, in the above description, main apparatuses and components which may be used for estimating the gaze point are described, and other apparatuses and components may be included. Further, the apparatuses and the components may be subdivided or integrated. Further, each apparatus can transmit and receive data via a communication network, and components relating to input and output of each apparatus (that is, an input device and an output device) are omitted. Further, in the case where processing relating to the apparatuses and the components is omitted, the apparatuses and the components may be omitted.

For example, it is assumed that one gaze point estimation model generation apparatus makes a plurality of copies of the generated gaze point estimation model and transmits the copies to a plurality of the gaze point estimation processing apparatuses 16, and each gaze point estimation processing apparatus 16 uses the gaze point estimation model as a program module which is part of software. Therefore, in FIG. 1, the gaze point estimation model generation apparatus 14 and the gaze point estimation processing apparatus 16 are illustrated as different apparatuses. However, the gaze point estimation model generation apparatus 14 and the gaze point estimation processing apparatus 16 may be the same apparatus. Further, for example, in the case where an image analysis result such as an optical flow is not used as input information to the gaze point estimation model, the learning image analyzer 144 and the estimation image analyzer 162 may be omitted.

Incidentally, in the present disclosure, a word of "learning" may mean machine learning or may mean deep learning. Further, a word "image" is a concept encompassing both a still image and a moving image, and, if there are no complications, may be read as a still image or a moving image. That is, an image to be used by the gaze point estimation processing system may be either a moving image or a still image. Further, while an image is handled as data within the apparatus, an expression form of image data is not particularly limited. Further, data indicating a position and information corresponding to the position may be handled as image data. A graph such as a heat map is also included in an image. Incidentally, there is a case where sound is provided along with display of an image. A gaze point can change by information such as sound, which is associated with an image. It is therefore assumed that an "image" in the present disclosure includes information associated with an image.

Each apparatus will be described. The learning image display apparatus 11 is an apparatus which displays an image for learning to a viewer. The learning image display apparatus 11 transmits the displayed image for learning to the gaze point estimation model generation apparatus 14. Incidentally, the viewer of the image for learning is described as a first viewer. While it is assumed that there are a plurality of first viewers, there may be one first viewer.

The gaze point detection apparatus 12 performs eye tracking for the first viewer who is viewing the image for learning and detects a gaze point of the first viewer on the image for learning. For example, a head-mounted display which can detect a gaze point is commercialized. The head-mounted display may be used as the learning image display apparatus 11 and the gaze point detection apparatus 12.

After detecting the gaze point, the gaze point detection apparatus 12 generates an image indicating the gaze point of the first viewer on the image for learning on the basis of the detection result and transmits the image to the gaze point estimation model generation apparatus 14. The image will be described as a detected gaze point image. The detected gaze point image is an image indicating a probability (or score) in which each pixel within the image for learning is a gaze point. The score can be indicated with probability distribution, or the like. The detected gaze point image can be an image such as a heat map, a contour map or a three-dimensional graph.

Figure 2:
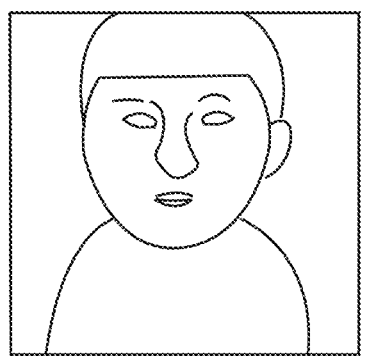
FIG. 2 is a diagram explaining an image for learning and a detected gaze point image.
Figure 2:
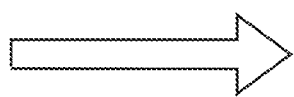
Figure 2:
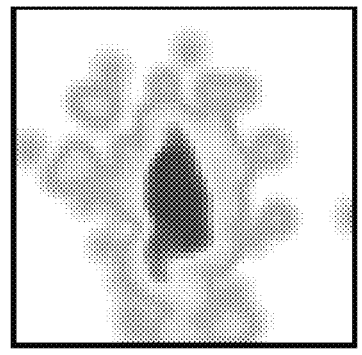
Figure 2:
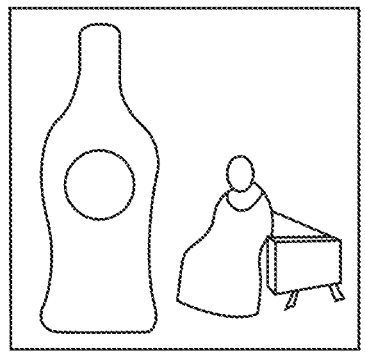
Figure 2:
Figure 2:
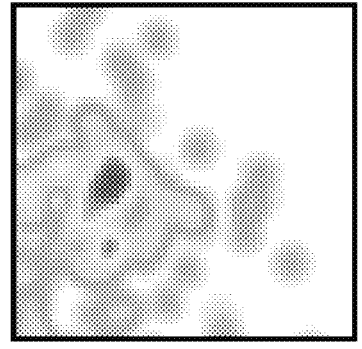

FIG. 2 is a diagram explaining the image for learning and the detected gaze point image. Images on an upper left side and on a lower left side indicate the images for learning. It is assumed that the image for learning is an image for advertising certain items. In the image on the upper left side, a person is displayed, and in the image on the lower left side, an item and the person are displayed. Images on an upper right side and on a lower right side indicate the detected gaze point images. In the detected gaze point images in the example in FIG. 2, a probability of each pixel being the gaze point is indicated with gray scale such that a dark portion is highly likely to be the gaze point, and a pale portion is less likely to be the gaze point. The detected gaze point image on the upper right side corresponds to the image for learning on the upper left side, and the detected gaze point image on the lower right side corresponds to the image for learning on the lower left side. It can be understood from this that, in the image for learning on the upper left side in which only a person is displayed, there is a high probability that the face of the person is gazed at. Meanwhile, in the image for learning on the lower left side in which an item and a person are displayed, while there is a high probability that the item is gazed at, there is a lower probability that the item is gazed at than the face of the person in the image for learning in which only a person is displayed (as shown in the image on the upper right side).

The image for learning and the detected gaze point image which corresponds to the image for learning and which indicates the gaze point on the image for learning, as illustrated in FIG. 2, are transmitted to the gaze point estimation model generation apparatus 14. Incidentally, it is assumed that the image for learning is associated with the detected gaze point image in advance, so that the gaze point estimation model generation apparatus 14 can recognize combination of the image for learning and the detected gaze point image. For example, the gaze point detection apparatus 12 may provide an identifier to the detected gaze point image such that the identifier of the detected gaze point image includes part of an identifier of the image for learning. Alternatively, correspondence relationship may be grasped on the basis of time at which the image for learning is displayed and time at which the gaze point in the detected gaze point image is detected.

Incidentally, in the first embodiment, the gaze point detection apparatus 12 generates the detected gaze point image, but the gaze point estimation model generation apparatus 14 may generate the detected gaze point image. For example, the gaze point detection apparatus 12 may transmit data relating to the gaze point such as data indicating a score for each pixel, instead of the detected gaze point image, to the gaze point estimation model generation apparatus 14, and the gaze point estimation model generation apparatus 14 may generate the detected gaze point image from the data, inside the gaze point estimation model generation apparatus 14.

The attribute data provision apparatus 13 provides data indicating an attribute of the first viewer to the gaze point estimation model generation apparatus 14. The data will be described as attribute data. For example, before the learning image display apparatus 11 displays the image, the first viewer inputs the attribute of the first viewer to the attribute data provision apparatus 13. Then, the attribute of the first viewer is also associated with the image for learning and the detected gaze point image in a similar manner. The attribute to be used is not particularly limited and may be determined as appropriate.

While it is assumed that the gaze point of the first viewer in the image for learning is located on a target to which the first viewer shows interest, the target is different in accordance with the attribute of the first viewer. For example, when sex, age, hometown, address, occupation, family configuration, annual income, hobby, a state, and the like of viewers are different, the target to which each viewer shows interest tends to differ. For example, when an image of an athlete is displayed, whether or not the first viewer shows interest is likely to be influenced by hobby of the first viewer. Further, in the case where a degree of fatigue of the first viewer is high, attention of the first viewer is impaired, and there is a probability that the first viewer does not gaze at the image. Therefore, it is preferable that the attribute of the first viewer is associated with the image for learning and the detected gaze point image. Incidentally, the attribute does not have to be necessarily associated.

Further, it is considered that behavior immediately before the first viewer views the image for learning, a location where the first viewer views the image for learning, a time slot in which the first viewer views the image for learning, or the like, affect the gaze point. These kinds of information may be used as the attribute. For example, in the case where a lifelog for the first viewer is recorded, the gaze point estimation model generation apparatus 14 may receive the lifelog from a lifelog record apparatus and use the received lifelog as attribute data. That is, the lifelog record apparatus corresponds to the attribute data provision apparatus 13.

The gaze point estimation model generation apparatus 14 performs learning using the image for learning and the detected gaze point image as input information to generate a gaze point estimation model.

Incidentally, the attribute may be included in the input information. Alternatively, the gaze point estimation model may be generated for each attribute. For example, a gaze point estimation model for male may be generated using the image for learning and the detected gaze point image by the male first viewer.

The learning image data storage 141, the detected gaze point image data storage 142 and the attribute data storage 143 provided at the gaze point estimation model generation apparatus 14 respectively store the image for learning, the detected gaze point image and the attribute data.

The learning image analyzer (or optical flow calculator) 144 generates information relating to the image for learning by analyzing the image for learning. It is assumed in the first embodiment that an optical flow is calculated from a time-series image for learning by the analysis. Incidentally, the learning image analyzer 144 may calculate information other than the optical flow.

The optical flow indicates a distribution state of velocity vector in a time-series image (between frames) such as a moving image. That is, the calculated optical flow indicates motion of an object displayed in the image for learning.

In the case where an object is suddenly displayed, or in the case where the displayed object moves, or the like, the object tends to be gazed at. That is, motion of the object displayed in the image for learning affects the gaze point. Therefore, the optical flow is used as the input information when the gaze point estimation model is generated. Incidentally, in the present disclosure, the "object" includes a living body such as a person.

Various methods are known as a method for calculating the optical flow. For example, there are a gradient method, a Lucas-Kanade method, matching, gradient and a particle filter. The method for calculating the optical flow used in the first embodiment is not particularly limited, and the method may be determined from publicly known methods as appropriate.

The gaze point estimation model generator 145 generates a gaze point estimation model at least by performing learning based on the image for learning and the detected gaze point image. Incidentally, the attribute may be included in the input information for learning as mentioned above. The gaze point estimation model may be a model of a multilayer neural network (deep neural network: DNN) for generating another image from the provided image. By the image for learning, the optical flow, or the like, being input to an input layer of the neural network and subjected to calculation in each intermediate layer, a simulated image is output from an output layer. The gaze point estimation model generator 145 updates a weighting coefficient (or parameter) for calculation in each intermediate layer so that the simulated image approaches the detected gaze point image. Whether the simulated image approaches the detected gaze point image may be judged using an existing matching method such as feature-based matching and area-based matching. In this manner, the neural network which has learned can generate an estimated gaze point image from an image for estimation.

While various kinds of neural networks are proposed, the neural network may be selected as appropriate. For example, it is known that, when a generative adversarial network (GAN) is used, it is possible to generate another image from the provided image with high accuracy.

In the case where the generative adversarial network is used, the gaze point estimation model includes an image generation model and an identification model. The image generation model is for generating the simulated image from the image for learning. The identification model is for identifying whether the provided image is the simulated image or the detected gaze point image. A parameter of the image generation model is updated through learning so that the simulated image which might be identified by the identification model as the detected gaze point image can be generated using the image generation model. Meanwhile, a parameter of the identification model is also updated through learning so that the simulated image can be correctly identified using the identification model. In this manner, by updating of the parameters of the image generation model and the identification model being repeated, the generated simulated image approaches the detected gaze point image. That is, it is possible to generate the detected gaze point image from the image for learning.

Further, it is known that accuracy of image generation is improved by using a conditional generative adversarial network (cGAN) in which conditions are added to the generative adversarial network and by changing a network structure of the intermediate layer from an Encoder-Decoder structure to a U-net structure. By using such a neural network, it is possible to generate a model for generating an image indicating the gaze point from the input image.

Further, output of the gaze point estimation model is not necessarily limited to image data. For example, the neural network of the gaze point estimation model may be separated into first and second neural networks. In the example, image data may be output from the first neural network, processing for the image is performed in the second neural network, and a pixel or a region which is assumed to be the gaze point may be output as the output of the gaze point estimation model. Further, functions by the first and the second neural networks may be realized with one neural network.

The estimation data provision apparatus 15 is an apparatus which provides a target image for estimation of the gaze point to the gaze point estimation processing apparatus. The image will be described as an image for estimation. Further, a viewer who is assumed to view the image for estimation will be described as a second viewer to distinguish from the first viewer of the image for learning. Incidentally, the second viewer may be the same as the first viewer.

Further, the estimation data provision apparatus 15 may provide data obtained by analyzing the image for estimation as well as the image for estimation to the gaze point estimation processing apparatus 16. The data will be described as data for estimation. For example, the estimation data provision apparatus 15 may recognize an object displayed in the image for estimation using an image recognition model and may provide name, an outline, or the like, of the object, along with the image for estimation. Further, in the case where the gaze point estimation model is generated for each attribute, an attribute of the second viewer may be included in the data for estimation. Further, hereinafter, description will be provided assuming that the image for estimation is also included in the data for estimation.

The gaze point estimation processing apparatus 16 estimates information from the image for estimation by using the gaze point estimation model, the information being relating to the gaze point of the second viewer.

The gaze point estimation model storage 161 stores the gaze point estimation models classified for each attribute. In some embodiments, the gaze point estimation model generator may classify the gaze point estimation models for each attribute and cause the gaze point estimation model storage 161 to store the classified gaze point estimation models. Thereby, the gaze point estimator 163 can extract the gaze point estimation model in accordance with the attribute.

The estimation image analyzer (optical flow calculator) 162 generates information relating to the image for estimation by analyzing the image for estimation. In the first embodiment, an optical flow for the image for estimation may be calculated from a time-series image for estimation through the analysis in a similar manner to the learning image analyzer 144.

The gaze point estimator 163 acquires the gaze point estimation model from the gaze point estimation model storage 161. In the case where the attribute of the second viewer is acquired from the estimation data provision apparatus 15, the gaze point estimation model in accordance with the attribute is extracted from a plurality of gaze point estimation models. Then, the gaze point estimator 163 generates information from the image for estimation using the gaze point estimation model, the information indicating a probability that each pixel within the image for estimation is the gaze point. The information may be information indicating whether or not each pixel is the gaze point. The information may be data indicating an image or may be data which is processed on the basis of the image.

Here, description will be provided assuming that an image is generated. The image will be described as an estimated gaze point image. When the image for estimation is input to an input layer of the gaze point estimation model, calculation based on a learned parameter is performed in each intermediate layer of the estimation model, and the estimated gaze point image is output from an output layer of the gaze point estimation model. The estimated gaze point image may be generated from the image for estimation and the optical flow.

The estimated gaze point image is an image indicating a probability (or score) that each pixel within the image for estimation is the gaze point. The estimated gaze point image is an image in a display form which is the same as that of the detected gaze point image, such as a heat map, a contour map and a three-dimensional graph.

While the generated estimated gaze point image may be regarded as the estimated gaze point, the gaze point estimator 163 may recognize part of the estimated gaze point image as the gaze point on the basis of the estimated gaze point image. The gaze point may be one pixel or a region including a plurality of pixels. For example, a pixel with the highest score in the estimated gaze point image may be set as the gaze point. Alternatively, the gaze point estimator 163 may calculate a region with the highest sum of scores within a unit circle or a unit rectangle using a predetermined unit circle or unit rectangle to set a pixel in the center of the region as the gaze point or to set the region as the gaze point. Alternatively, the gaze point estimator 163 may set a region where scores of all the included pixels are equal to or greater than a threshold as the gaze point. For example, in the case where the estimated gaze point image is expressed with a heat map, the darkest region may be set as the gaze point.

Information relating to the gaze point such as the estimated gaze point image and the gaze point is output to the designated output destination apparatus 17. The output destination apparatus 17 is not particularly limited. Therefore, various kinds of processing can be executed at the output destination apparatus 17 on the basis of the information relating to the estimated gaze point. Further, the gaze point may be displayed with an image or may be displayed with a position coordinate, or the like.

For example, the output destination apparatus 17 may be an image display apparatus such as a monitor, and a processing result by the gaze point estimation processing apparatus 16 may be displayed on the monitor or the like. Alternatively, an estimation result may be transmitted to an external apparatus or a control apparatus which controls the external apparatus, and the external apparatus may be controlled on the basis of the estimation result.

For example, the estimation data provision apparatus 15 and the output destination apparatus 17 are the same imaging apparatus (for example, a digital camera). In the case where the imaging apparatus provides the image for estimation to the gaze point estimation processing apparatus 16 and where the gaze point is returned to the imaging apparatus, the imaging apparatus can change setting so that the imaging apparatus can photograph an object including the gaze point or an object included in the gaze point (in the case where the gaze point is a region) with high accuracy. For example, it is possible to perform control such as focusing and zooming.

Further, in some embodiments, the output destination apparatus 17 is a control apparatus for a mobile body such as a drone and a rescue robot. In this case, it can be considered that an image from a camera mounted on the mobile body is used as the image for estimation. Then, by the estimated gaze point image being transmitted to the control apparatus, the control apparatus can control movement of the mobile body on the basis of the estimated gaze point image. For example, it is possible to perform control such as moving the mobile body toward the gaze point. This enables to move the mobile body in a direction in which a person is interested without manipulation or control by a person.

Figure 3:
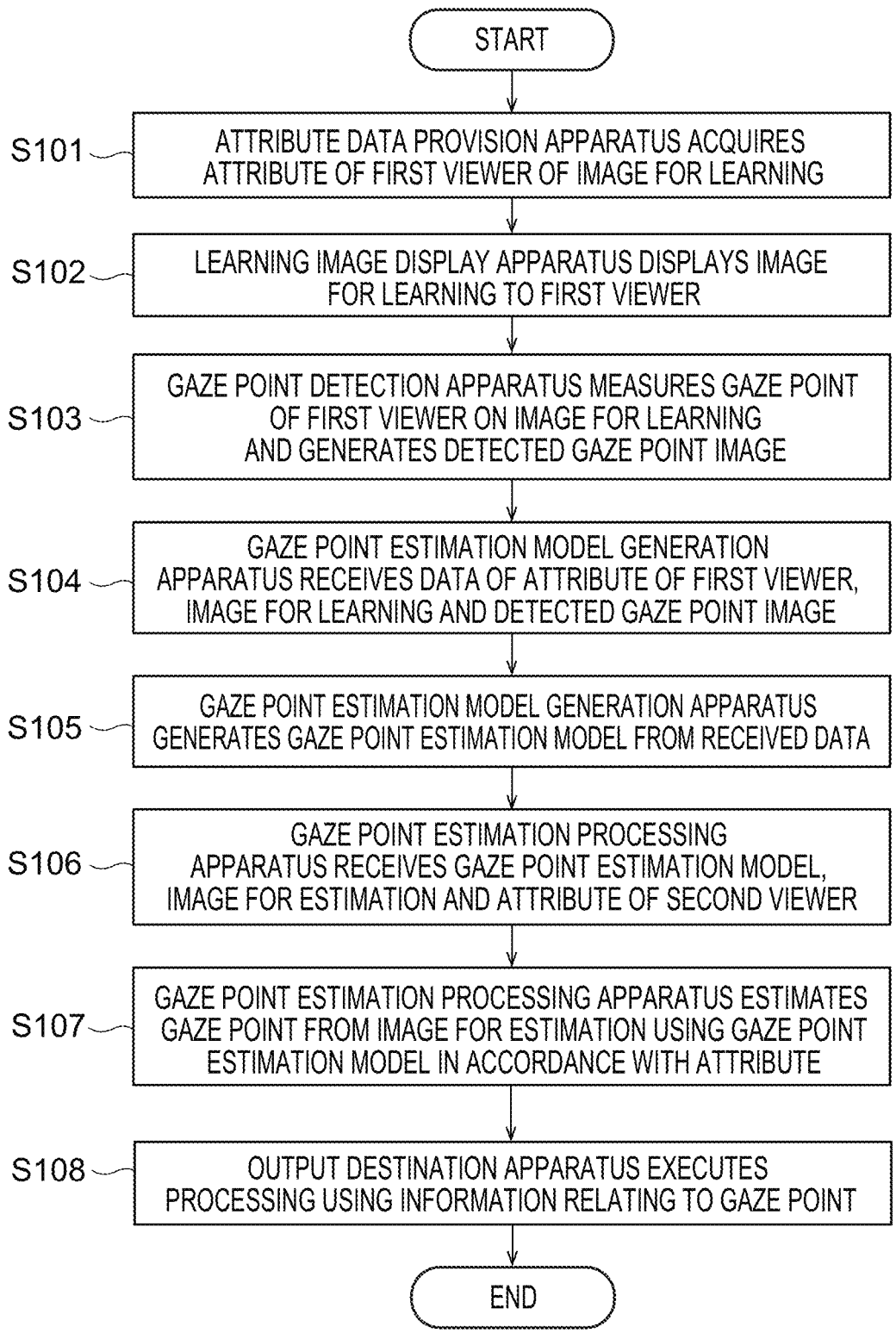
FIG. 3 is a schematic flowchart of processing of the gaze point estimation processing system according to the first embodiment.

Processing flow of the first embodiment will be described next. FIG. 3 is a schematic flowchart of processing of the gaze point estimation processing system 1 according to the first embodiment. In the present flowchart, a case where the attribute data is used will be described.

The attribute data provision apparatus 13 acquires an attribute of the first viewer who views the image for learning (S101). The learning image display apparatus 11 displays the image for learning to the first viewer (S102). The gaze point detection apparatus 12 measures a gaze point of the first viewer on the image for learning to generate a detected gaze point image (S103). Then, data indicating each of the attribute of the first viewer, the image for learning and the detected gaze point image is transmitted from each apparatus, and the gaze point estimation model generation apparatus 14 receives the data (S104).

The gaze point estimation model generation apparatus 14 generates the gaze point estimation model from the received data (S105). The generated gaze point estimation model is transmitted to the gaze point estimation processing apparatus 16. Then, the data for estimation such as the image for estimation and an attribute of the second viewer is transmitted from the estimation data provision apparatus 15, and the gaze point estimation processing apparatus 16 receives the data for estimation (S106). The gaze point estimation processing apparatus 16 estimates the gaze point from the image for estimation using the gaze point estimation model in accordance with the attribute of the second viewer (S107). Then, information relating to the gaze point is transmitted to the output destination apparatus 17, and the output destination apparatus 17 executes processing using the information relating to the gaze point (S108). In this manner, service based on the estimated gaze point is provided.

Figure 4:
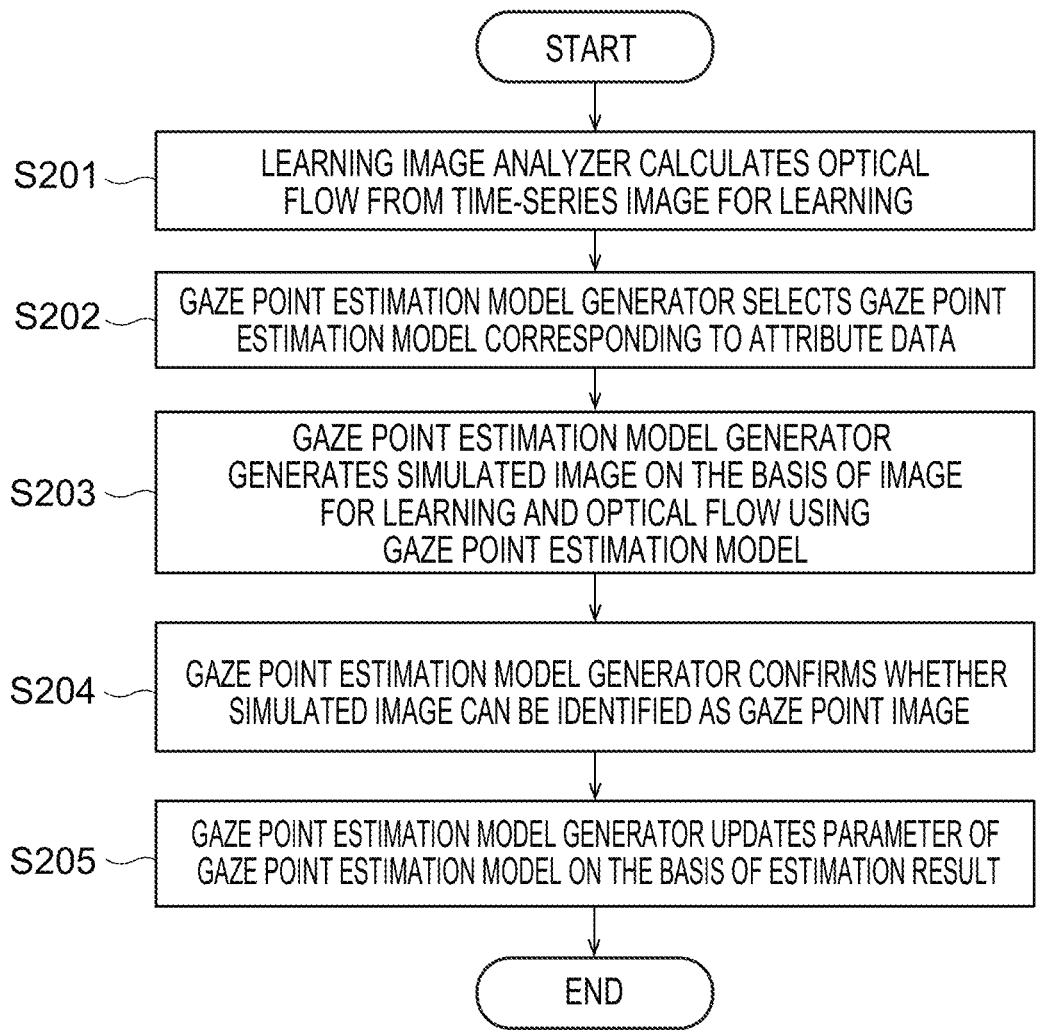
FIG. 4 is a schematic flowchart of processing of a gaze point estimation model generation apparatus according to the first embodiment.

Processing flow of the gaze point estimation model generation apparatus 14 will be described next. FIG. 4 is a schematic flowchart of processing of the gaze point estimation model generation apparatus 14 according to the first embodiment. In the present flowchart, a case where a generative adversarial network is used will be described.

The learning image analyzer 144 calculates an optical flow from a time-series image for learning (S201). Meanwhile, the gaze point estimation model generator 145 selects a gaze point estimation model corresponding to the attribute data (S202). The gaze point estimation model generator 145 generates a simulated image on the basis of the image for learning and the corresponding optical flow using the selected gaze point estimation model (S203). The gaze point estimation model generator 145 determines whether or not the simulated image can be recognized as the detected gaze point image (S204). The gaze point estimation model generator 145 updates a parameter of the gaze point estimation model on the basis of the determination result (S205). As a result of performing these processing many times, the parameter of the gaze point estimation model is improved, so that accuracy of the gaze point estimation model is improved.

Figure 5:
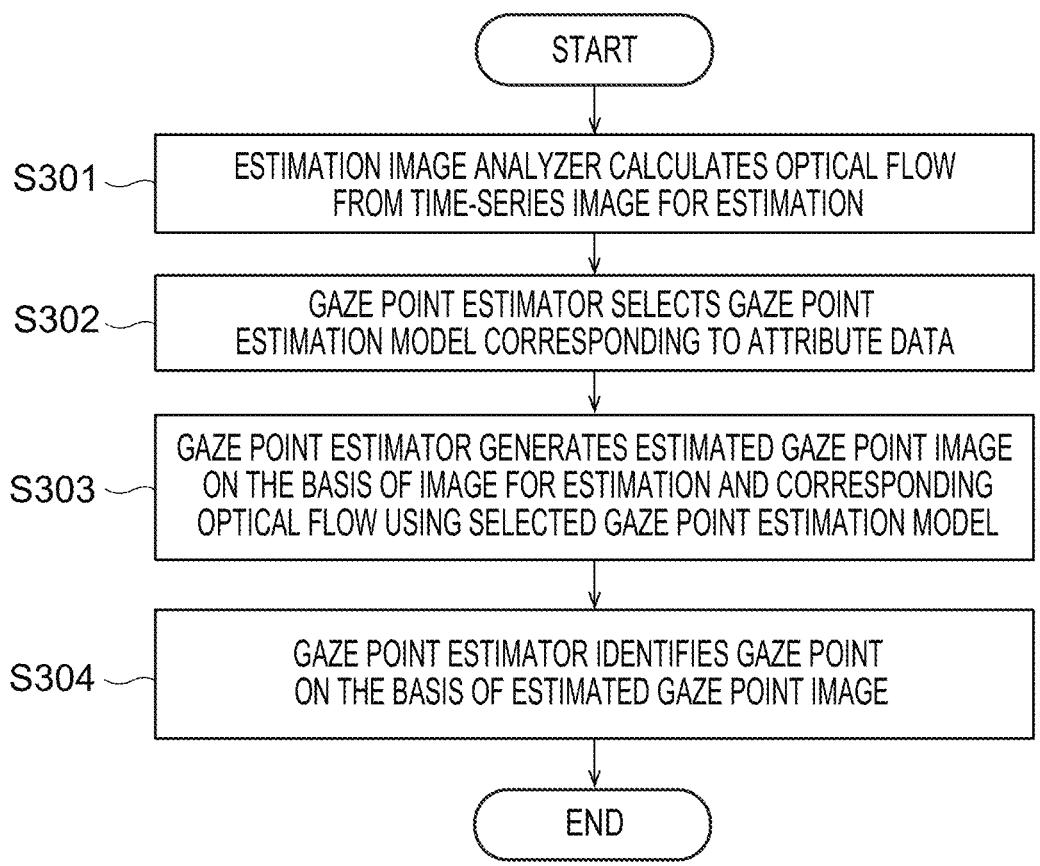
FIG. 5 is a schematic flowchart of processing of a gaze point estimation processing apparatus according to the first embodiment.

Processing flow of the gaze point estimation processing apparatus 16 will be described next. FIG. 5 is a schematic flowchart of processing of the gaze point estimation processing apparatus 16 according to the first embodiment.

The estimation image analyzer 162 calculates an optical flow from a time-series image for estimation (S301). Meanwhile, the gaze point estimator 163 selects a gaze point estimation model in accordance with the attribute from a plurality of gaze point estimation models stored in the gaze point estimation model storage 161 (S302). The gaze point estimator 163 generates an estimated gaze point image on the basis of the image for estimation and the corresponding optical flow using the selected gaze point estimation model (S303). Further, the gaze point estimator 163 identifies the gaze point on the basis of the estimated gaze point image (S304). In this manner, information relating to the gaze point is generated.

Incidentally, the flowchart in the present disclosure is an example, and is not limited to the above-described example. Procedure may be rearranged, added and omitted in accordance with the specifications, change, or the like, required for the embodiment. For example, in the case where an optical flow is not used, calculation of an optical flow is omitted. Further, while processing is sequentially performed for the purpose of explanation in the above description, calculation of an optical flow and selection of a gaze point estimation model may be processed in parallel. This similarly applies to flowcharts described below.

As described above, according to the first embodiment, it is possible to estimate the gaze point on the basis of the image. In the case where eye tracking is performed, there are a drawback that an apparatus such as a camera for photographing a viewer is required and another drawback that it is necessary to continuously recognize relative positional relationship between the viewer and a reference point. However, the first embodiment does not have such drawbacks.

Further, it is also possible to generate a gaze point estimation model in accordance with the attribute of the first viewer, and by estimating the gaze point using the gaze point estimation model in accordance with the attribute of the second viewer, accuracy of estimation of the gaze point is improved.

Further, because it is also possible to generate a gaze point estimation model while an optical flow is taken into account, and the gaze point is estimated in accordance with motion of an object within an image, accuracy of estimation of the gaze point is improved.

Second Embodiment

Figure 6:
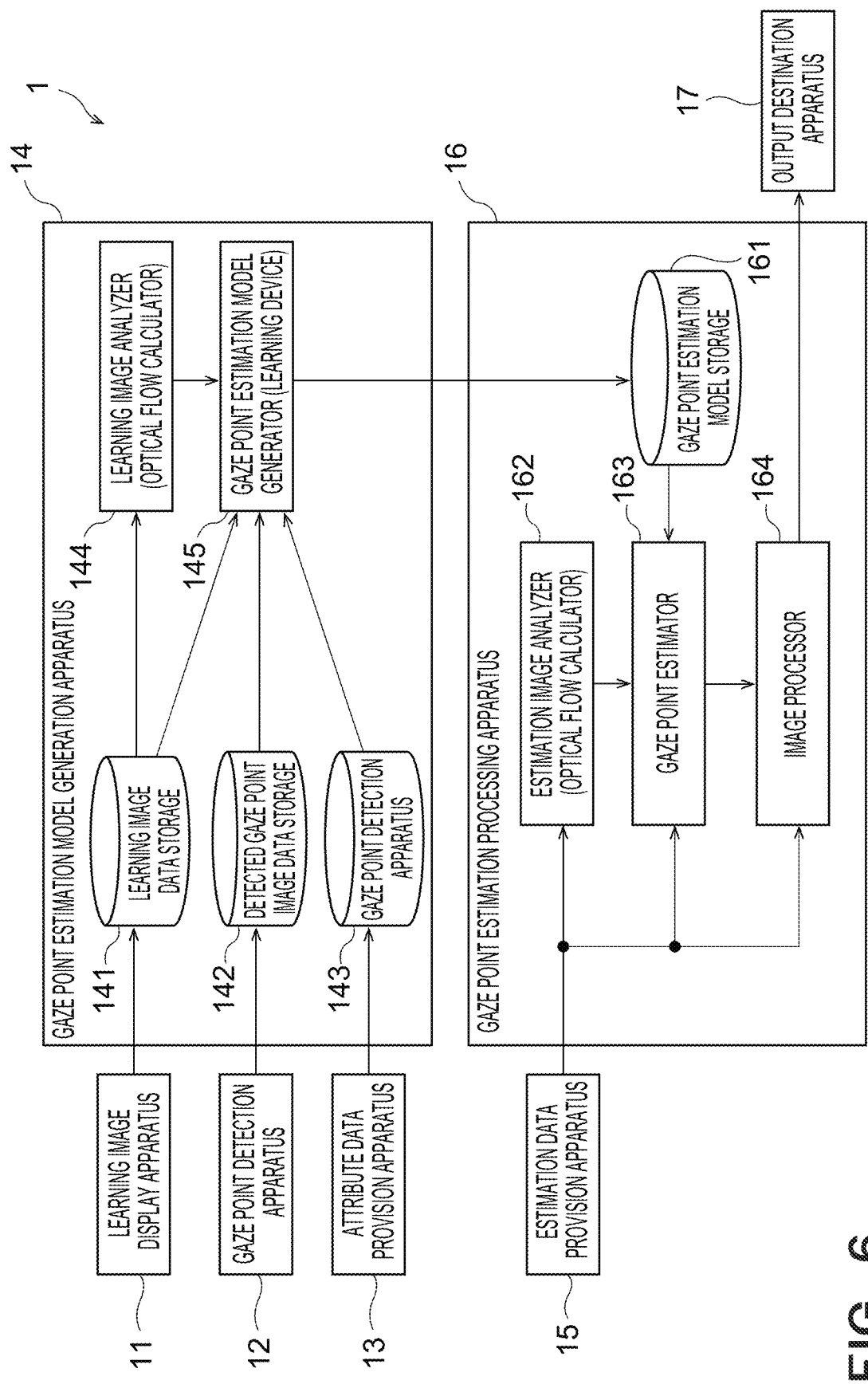
FIG. 6 is a block diagram illustrating an example of a gaze point estimation processing system according to a second embodiment.

FIG. 6 is a block diagram illustrating an example of a gaze point estimation processing system according to a second embodiment. In the gaze point estimation processing system 1 illustrated in FIG. 6, the gaze point estimation processing apparatus 16 further includes an image processor 164. Incidentally, description of the same matters as those of the first embodiment is omitted.

The image processor 164 processes the image for estimation on the basis of the gaze point within the image for estimation. Then, the processed image for estimation is output to the output destination apparatus 17. That is, the gaze point estimation processing apparatus 16 in the second embodiment is also an image processing apparatus, and the output destination apparatus 17 may be an image display apparatus. Further, the image for estimation is an image to be displayed at the output destination apparatus 17.

The image for estimation may be processed on the basis of a rule defined in advance. The rule may be provided from the estimation data provision apparatus 15 or may be set in advance within the gaze point estimation processing apparatus 16.

The processing rule may be determined as appropriate. For example, processing may be performed such that information indicating outlines of objects within the image for estimation is received from the estimation data provision apparatus 15, and one of the objects within the image for estimation is finely rendered on the basis of the gaze point within the image for estimation.

For example, in the case where a person operates a mobile body such as a robot through remote communication while viewing an image transmitted from the mobile body, it is assumed that the gaze point is detected using the transmitted image as the image for estimation, the transmitted image is processed on the basis of the gaze point, and the processed image is displayed to the operator. In this assumption, there is a probability that the operator does not recognize an object away from the gaze point, and there is a probability that the mobile body collides with the object. Therefore, it is considered that the image processor 164 processes the transmitted image so as to emphasize the object away from the gaze point. By such processing being performed, it is possible to assist driving, operation, or the like.

Further, an image around the gaze point in the image for estimation may be changed to an advertisement in accordance with an attribute corresponding to the image for estimation. The advertisement only has to be included in the data for estimation. Further, in the case where a plurality of advertisements are included in the data for estimation, the image processor 164 may extract an advertisement in accordance with the attribute of the second viewer. This enables to meet a need of a provider of the image for estimation, an advertising agency, or the like.

Further, part or the whole of an image to be displayed from now may be changed in accordance with the gaze point of the second viewer. For example, in the case where an object A and an object B are displayed on the image for estimation, it is assumed that the image processor 164 recognizes that the second viewer gazes at the object A on the basis of the gaze point. In this case, when the image for estimation relating to the object A and the image for estimation relating to the object B are received as the images for estimation to be processed next, the image processor 164 uses the image for estimation relating to the object A. Alternatively, in this case, the image processor 164 performs processing of deleting the object B from the image for estimation to be processed next. In this manner, by the image for estimation being specialized for the second viewer, a satisfaction level, a degree of concentration, or the like, of the second viewer with respect to the image are improved.

Figure 7:
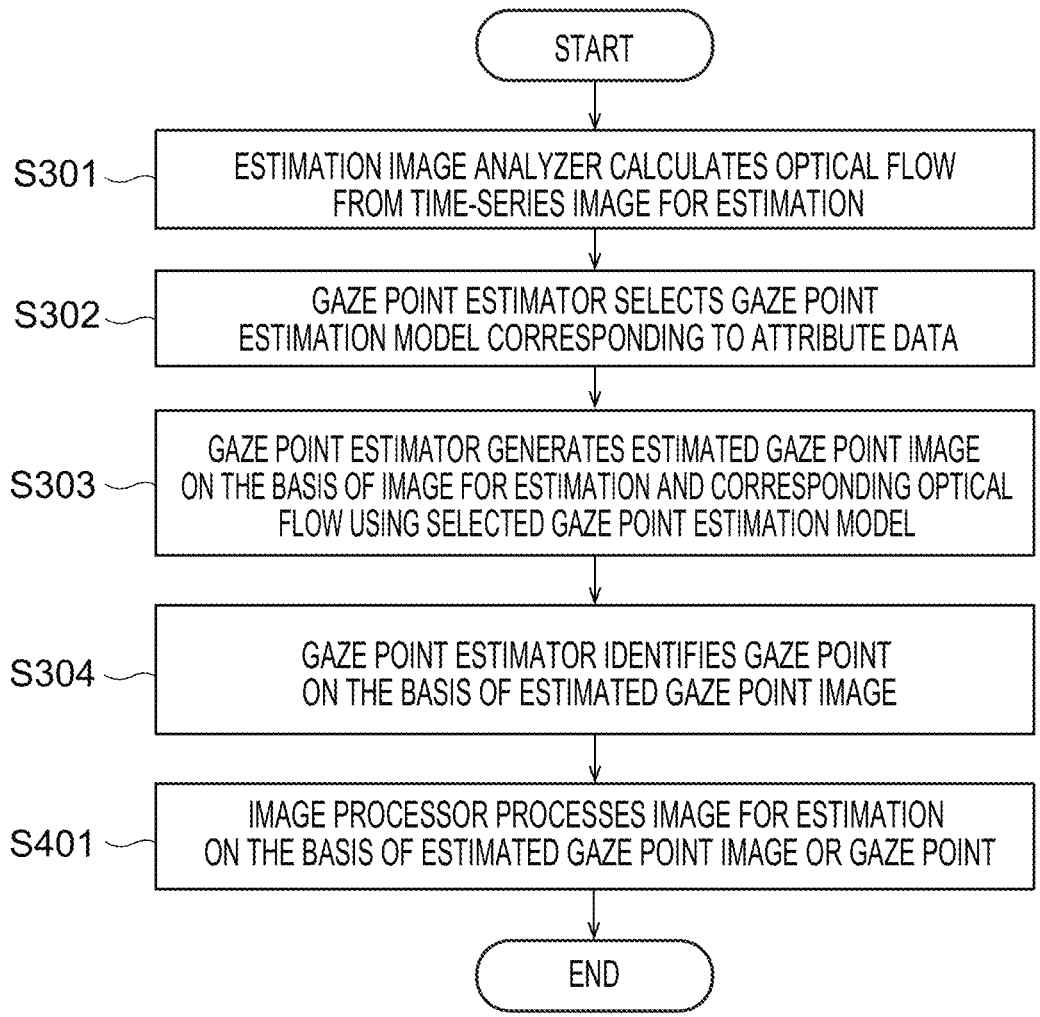
FIG. 7 is a schematic flowchart of processing of a gaze point estimation processing apparatus according to the second embodiment.

FIG. 7 is a schematic flowchart of processing of the gaze point estimation processing apparatus 16 according to the second embodiment. Processing from S301 to S304 in the processing flow of the gaze point estimation processing apparatus 16 in the second embodiment is the same as that in the flowchart illustrated in FIG. 5. Then, after the gaze point estimator 163 identifies the gaze point (S304), the image processor 164 processes the image for estimation on the basis of the estimated gaze point image or the gaze point (S401). Thereby, the output destination apparatus 17 can execute processing using the processed image for estimation.

As described above, according to the second embodiment, the gaze point estimation processing apparatus 16 processes the image for estimation on the basis of the gaze point. This enables to change the image for estimation in accordance with an object which is gazed at by the second viewer in the image for estimation, so that it is possible to provide an image which meets a need of the second viewer or a provider (e.g., an advertising agency).

Third Embodiment

Figure 8:
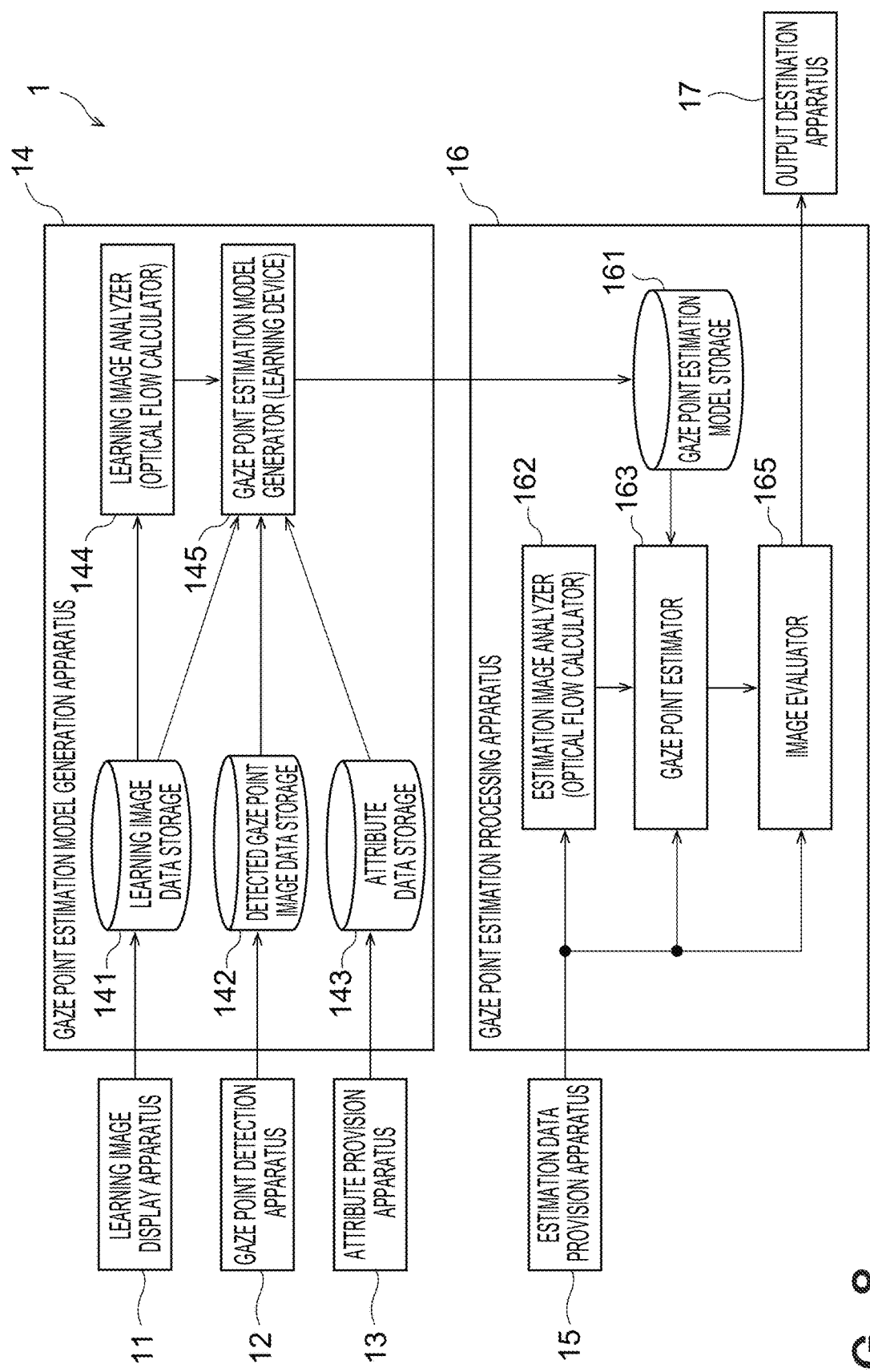
FIG. 8 is a block diagram illustrating an example of a gaze point estimation processing system according to a third embodiment.

FIG. 8 is a block diagram illustrating an example of a gaze point estimation processing system according to a third embodiment. In the gaze point estimation processing system 1 illustrated in FIG. 8, the gaze point estimation processing apparatus 16 further includes an image evaluator 165. Incidentally, description of the same matters as those of the first embodiment is omitted.

The image evaluator 165 evaluates the image for estimation on the basis of the gaze point within the image for estimation. Then, evaluation by the image evaluator 165 is output to the output destination apparatus 17. That is, the gaze point estimation processing apparatus 16 in the third embodiment is also an image evaluation apparatus.

The image for estimation may be evaluated on the basis of a predetermined evaluation rule. The evaluation rule may be provided from the estimation data provision apparatus 15 or may be set and registered in advance in the gaze point estimation processing apparatus 16.

Content of the evaluation rule may be determined as appropriate. For example, a region favorable as the gaze point may be designated from the estimation data provision apparatus 15, and the image for estimation may be evaluated using a difference between the region and the estimated gaze point. Further, the evaluation may be expressed with a score, or may be classified into predetermined categories such as "excellent", "good", "approved" and "disapproved".

Figure 9:
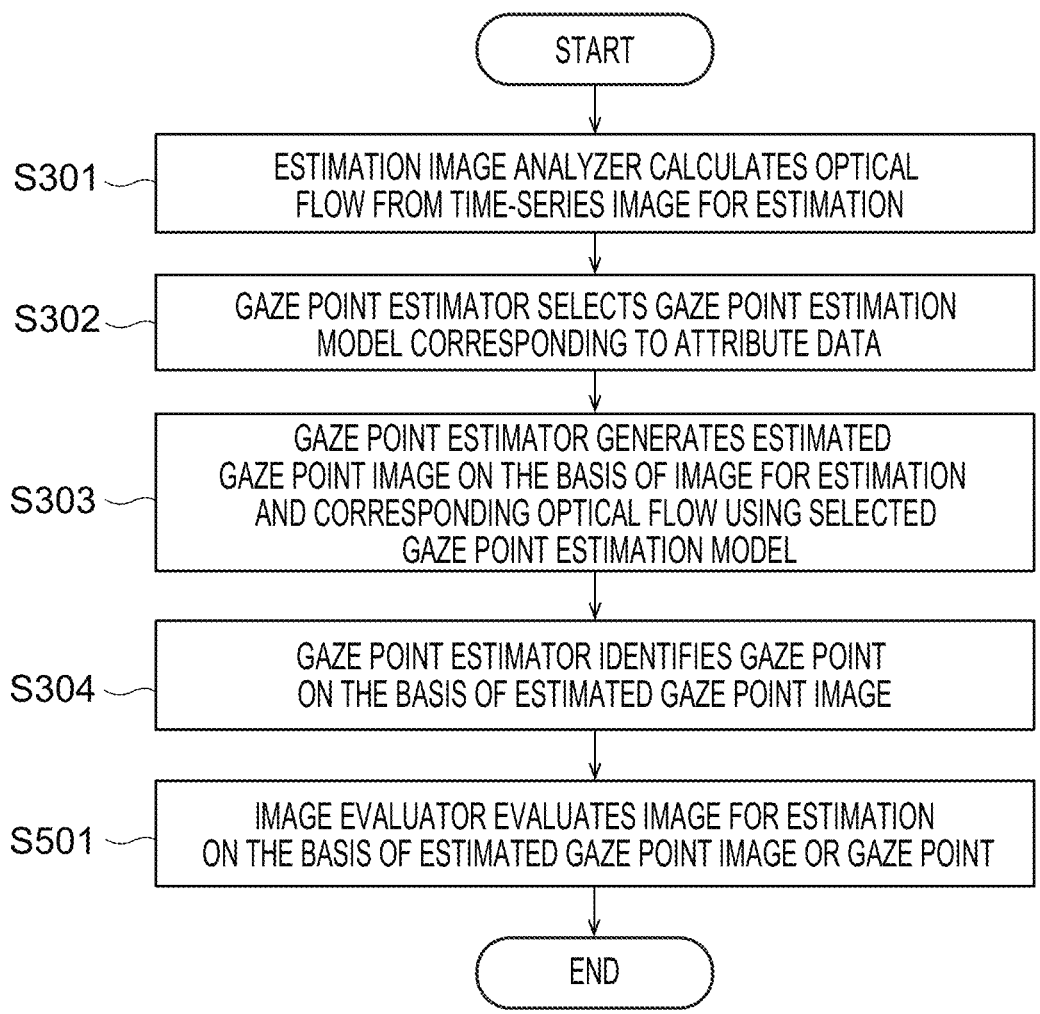
FIG. 9 is a schematic flowchart of processing of a gaze point estimation processing apparatus according to the third embodiment.

FIG. 9 is a schematic flowchart of processing of the gaze point estimation processing apparatus 16 according to the third embodiment. Processing from S301 to S304 in the processing flow of the gaze point estimation processing apparatus 16 of the third embodiment is the same as that in the flowchart illustrated in FIG. 5. Then, after the gaze point estimator 163 identifies the gaze point (S304), the image evaluator 165 evaluates the image for estimation on the basis of the estimated gaze point image or the gaze point (S501). Thereby, the output destination apparatus 17 can execute processing using the evaluation of the image for estimation.

As described above, according to the third embodiment, the gaze point estimation processing apparatus 16 performs processing until evaluation of the image for estimation on the basis of the gaze point. This enables a provider of the image for estimation to obtain objective evaluation of the image for estimation before the image for estimation is shown to the second viewer, so that the provider can improve the image for estimation.

Fourth Embodiment

Figure 10:
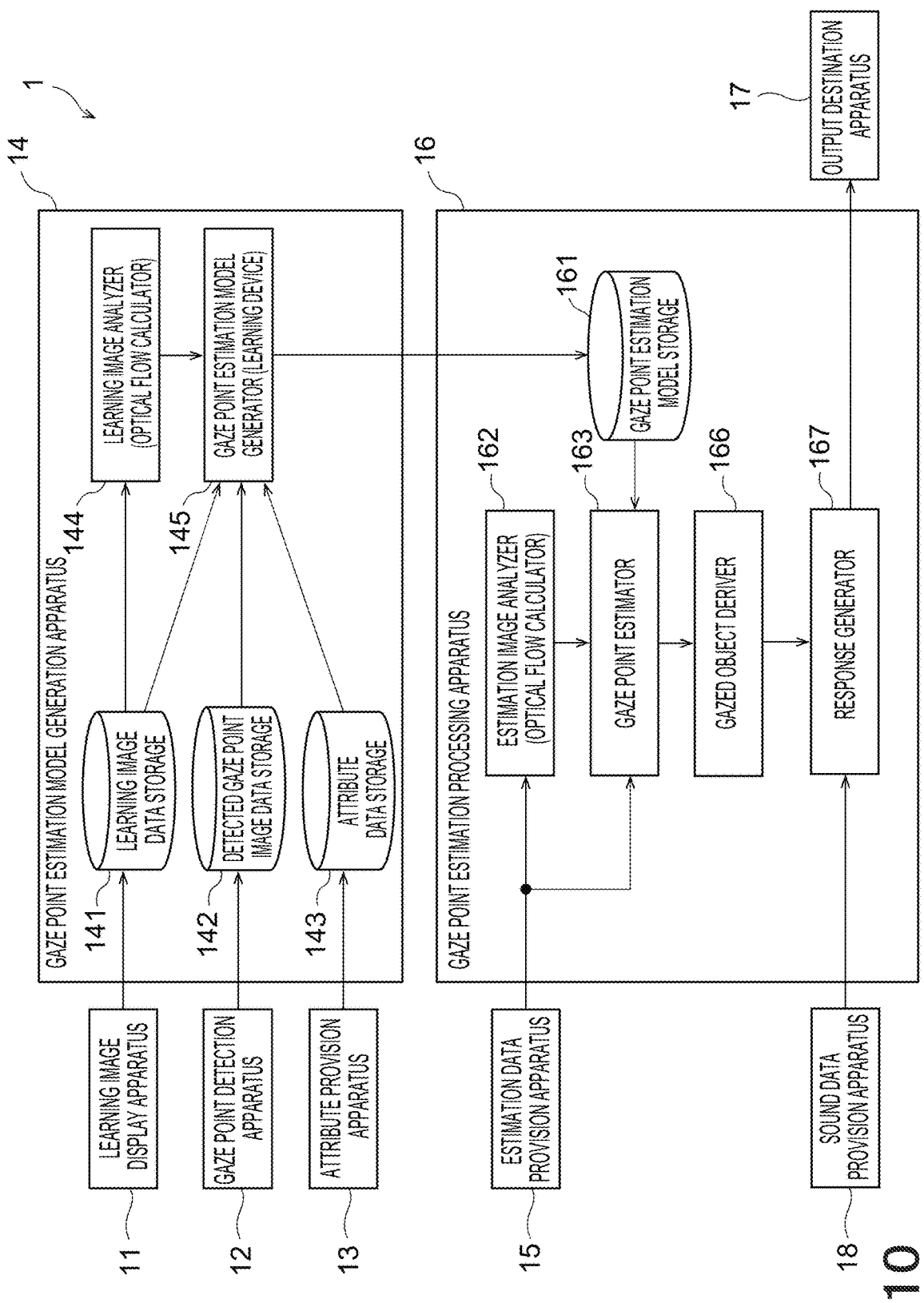
FIG. 10 is a block diagram illustrating an example of a gaze point estimation processing system according to a fourth embodiment.

FIG. 10 is a block diagram illustrating an example of a gaze point estimation processing system according to a fourth embodiment. In the gaze point estimation processing system 1 illustrated in FIG. 10, a sound data provision apparatus 18 is further provided. Further, the gaze point estimation processing apparatus 16 further includes a gazed object deriver 166 and a response generator 167. Incidentally, description of points similar to the first embodiment will be omitted.

In the fourth embodiment, assuming a system having a multimodal function utilizing both an image and sound, information relating to the estimated gaze point is applied to conversation between an apparatus and a person. It is assumed here that an apparatus which has a conversation with the second viewer recognizes an object suggested by the second viewer by utilizing the information relating to the estimated gaze point.

An instruction issued by a person is often unclear. For example, in an instruction such as "please pass me that", it is difficult for others to understand what is meant by "that". However, in the case where such an instruction using a demonstrative pronoun is issued, there is a high probability that a person who issues the instruction is gazing at an object meant by "that". Therefore, in the fourth embodiment, by the information relating to the gaze point being used as auxiliary information for a term which is difficult to be identified, an object which a user tries to convey is specified.

The sound data provision apparatus 18 is an apparatus which converts sound picked up by a microphone, or the like, into data, and transmits the data to the gaze point estimation processing apparatus 16. The data may be, for example, text of sound of the second viewer. Alternatively, the sound data provision apparatus 18 may determine sound picked up by the microphone, and may transmit the determination result to the gaze point estimation processing apparatus 16. The sound can be converted into data using general-purpose sound recognition software.

Incidentally, in the fourth embodiment, a reference term such as "this" and "that" and a term corresponding to the reference term, which are included in sound data are required. Therefore, the sound data provision apparatus 18 may transmit all the sound data or may transmit only data relating to a term required. Incidentally, the term corresponding to the reference term may be simply a term which follows the reference term. For example, in the case where sound data of "let me know about that restaurant" is obtained, the sound data provision apparatus 18 transmits at least "that" and "restaurant" to the gaze point estimation processing apparatus 16. Incidentally, in the case where all the sound data is transmitted, the gaze point estimation processing apparatus 16 only has to extract the reference term and the term corresponding to the reference term by performing matching with reference terms included in a list registered in advance.

The gazed object deriver 166 of the gaze point estimation processing apparatus 16 derives an object estimated to be gazed at by the second viewer on the basis of the gaze point within the image for estimation. The object will be described as a gazed object. An object including the gaze point may be set as a gazed object. In the case where the gaze point is a region, one of objects within the region may be set as the gazed object. For example, an object displayed largest among objects within the region may be set as the gazed object.

The gazed object deriver 166 derives name of the gazed object. The name of the gazed object may be derived from the data for estimation. Alternatively, the gazed object deriver 166 may estimate the name of the object using an image recognition model generated in advance.

Further, the gazed object deriver 166 derives a term indicating a position of the gazed object. The term indicating the position is preferably not a coordinate value of a pixel, but a term which is commonly used in daily conversation. For example, in the case where a pixel of the gaze point is located in the first quadrant among four quadrants based on a center coordinate of the image for estimation, a user recognition estimator derives a term of "upper right" allocated to the first quadrant in advance. The allocated term may be derived from a list indicating correspondence relationship between positions and allocated terms stored in advance.

The response generator 167 determines whether the term corresponding to the reference term matches the name of the gazed object. When the term corresponding to the reference term matches the name of the gazed object, a response relating to the gazed object is generated using the sound data, information of the gazed object included in the data for estimation, or the like, assuming that the term corresponding to the reference term indicates the gazed object.

Figure 11A:
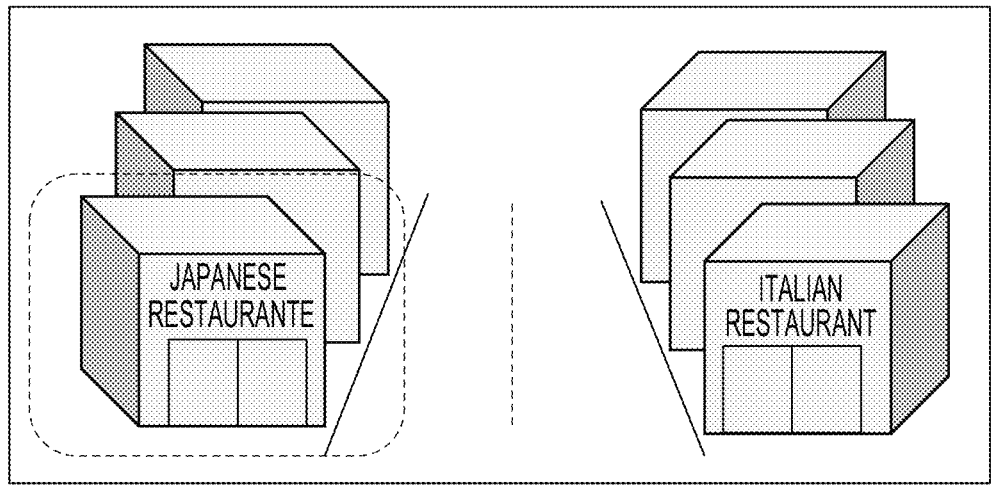
FIGS. 11A and 11B are diagrams explaining conversation with the gaze point estimation processing apparatus.
Figure 11B:
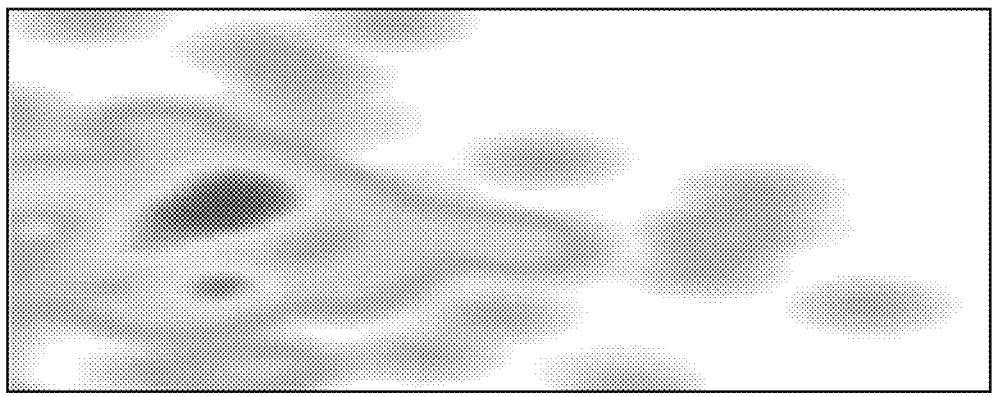

FIGS. 11A and 11B are diagrams explaining conversation with the gaze point estimation processing apparatus 16. It is assumed in the example in FIGS. 11A and 11B that the second viewer is a driver who is driving a vehicle. FIG. 11A illustrates an image which the driver is viewing. The image is acquired from a camera mounted on the vehicle. Then, it is assumed that the image is transmitted to the gaze point estimation processing apparatus 16 as the image for estimation. FIG. 11B is a diagram illustrating the estimated gaze point image generated by the gaze point estimator 163. On a left side of FIG. 11B, a region where density of black is high exists. If the region is set as the gaze point, the gazed object deriver 166, for example, derives that the "gazed object" is a "restaurant", and a "position of the gazed object" is on the "left side" and outputs the result to the response generator 167.

It is assumed that, when information relating to the above-described gaze point is input to the response generator 167, sound data of "let me know about that restaurant" is input to the response generator 167. The response generator 167 recognizes that the sound data includes name of the gazed object of "restaurant" and generates a response. For example, the response generator 167 generates a question of "Does that restaurant indicate a restaurant on the left side?" using "that restaurant" included in the sound data and the "left side" included in the information relating to the gaze point.

Alternatively, the response generator 167 may generate an answer using the information of the object within the image for estimation provided from the estimation data provision apparatus 15. For example, it is considered that the data for estimation includes classification categories of the above-described restaurant (such as, for example, Japanese food, Italian food and fast food), company name, opening hours, or the like. It is also possible to generate an answer of "the restaurant on the left side is a Japanese food restaurant" using these kinds of information.

FIG. 11A illustrates a restaurant also on a right side. When there is no information relating to the gaze point, it is not possible to recognize which of the restaurants is suggested by "that restaurant" said by the second viewer. Therefore, while a question for confirming which restaurant is suggested is generated, it is assumed that a question for seeking only approval of "does that restaurant indicate a restaurant on the left side?" provides less dissatisfaction to the second viewer. For example, if a question of "which restaurant?" is asked to the second viewer, because the second viewer has to explain the restaurant, such a question increases dissatisfaction of the second viewer. Further, while it can be considered that a question of "Does that restaurant indicate the restaurant on the left side or the restaurant on the right side?" is asked, if the second viewer does not recognize the restaurant on the right side, there is a probability that the second viewer cannot respond to the question. Further, in the case where a question of "does that restaurant indicate the restaurant on the left side?" is asked without grounds, there is a higher probability that a question is asked for the restaurant which is not gazed at than in the fourth embodiment. That is, there is a higher probability that dissatisfaction of the second viewer increases than in the fourth embodiment.

Thus, the fourth embodiment is able to generate a question of seeking only an approval or an answer even in the case where there are a plurality of objects in the image viewed by the second viewer, the object being relating to the name included in the sound data. This enables to relieve dissatisfaction felt by the second viewer and to realize smooth conversation.

The response generator 167 transmits the generated response data to the output destination apparatus 17. It is assumed in the fourth embodiment that the output destination apparatus 17 is a sound generation apparatus. The output destination apparatus 17 converts the response data into sound and outputs the sound with a speaker, or the like. This enables to establish conversation with the second viewer. The sound generation apparatus can be realized using general-purpose software which synthesizes sound from text.

Figure 12:
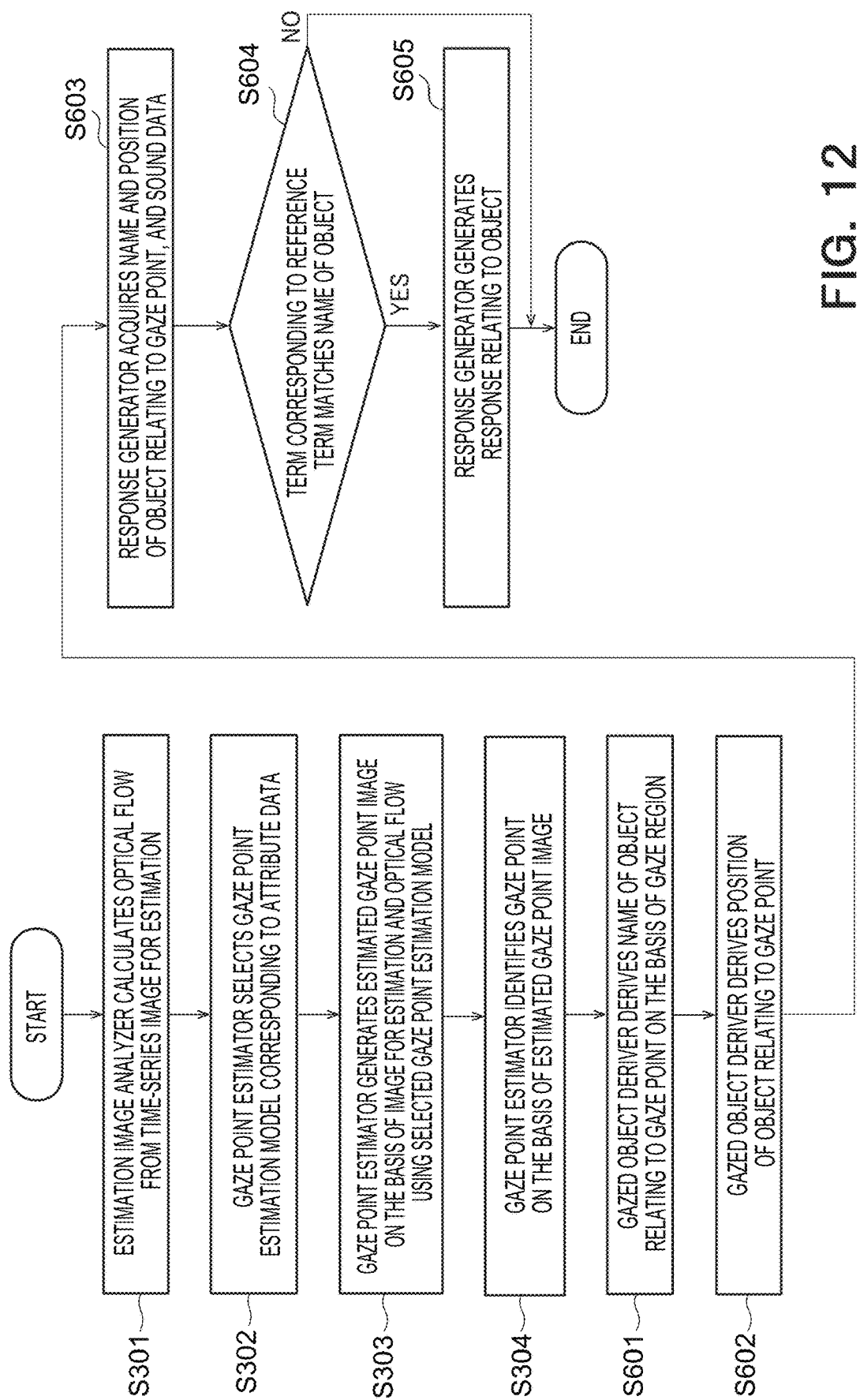
FIG. 12 is a schematic flowchart of processing of a gaze point estimation processing apparatus according to the fourth embodiment.

FIG. 12 is a schematic flowchart of processing of the gaze point estimation processing apparatus 16 according to the fourth embodiment. Processing from S301 to S304 relating to estimation of the gaze point is the same as that in the embodiments described above, and processing after S304 will be described here.

The gazed object deriver 166 derives name of the gazed object on the basis of the estimated gaze point (S601). The gazed object deriver 166 derives a term indicating a position of the gazed object (S602). The response generator 167 acquires the name and the position of the gazed object from the gazed object deriver 166 and acquires sound data from the sound data provision apparatus 18 (S603). In the case where the term corresponding to the reference term matches the name of the object (S604: Yes), the response generator 167 generates a response relating to the object (S605). By the response being generated and transmitted to the sound generation apparatus in this manner, conversation with the second viewer is established.

Incidentally, in the above description, the gaze point estimation processing apparatus 16 derives the gazed object and generates a response, but the gaze point estimation processing apparatus 16 may perform processing until derivation of the gazed object and transmit the derived gazed object to the output destination apparatus 17, and the output destination apparatus 17 may generate a response.

Incidentally, in the above description, it is assumed that conversation between an apparatus and a person is performed using sound. However, there can be a case where conversation is performed using sign language, through writing (text), or the like, instead of the sound with a hearing-impaired person or a person who uses different language. In such a case, instead of the sound data provision apparatus 18, a gesture decryption apparatus which decrypts gesture shot by a camera, or an optical character recognition apparatus (OCR) which decrypts characters photographed by a camera is used. Then, instead of sound data, data indicating content decrypted by these apparatuses is transmitted to the gaze point estimation processing apparatus 16. Thereby, processing of generating a response by the gaze point estimation processing apparatus 16 can be performed in a similar manner as described above. That is, input data to the response generator 167 is not limited to the sound data. Incidentally, a transmission destination of the response may be the image display apparatus or may be the sound generation apparatus. Replacement of the response content with different language may be performed at the transmission destination of the response.

As described above, according to the fourth embodiment, in the case where an instruction is issued to an apparatus such as a robot using sound, information relating to the gaze point is used as auxiliary information. This enables to specify an object which the user tries to convey and to make a response even for a term difficult to be specified such as a term including a demonstrative pronoun.

Incidentally, the above-described embodiments may be combined. For example, there is also an embodiment relating to the gaze point estimation processing apparatus including both the image processor 164 in the second embodiment and the image evaluator 165 in the third embodiment. The image processor 164 may change processing content on the basis of evaluation by the image evaluator 165.

Incidentally, in the above-described embodiments, the gaze point estimation processing apparatus 16 expresses the information relating to the gaze point with a score with respect to each pixel, but the information relating to the gaze point may be expressed with a coordinate of each pixel relating to the gaze point. For example, in the case where a region where the gaze point exists is expressed with a bounding box, the gaze point estimator 163 may be configured to output information relating to four coordinates corresponding to a rectangle. In this case, the gaze point estimation model generation apparatus 14 learns a gaze point estimation model so as to output information relating to coordinates of the bounding box relating to the gaze point. Further, as the information relating to the gaze point, a rectangular region and information of the score corresponding to the region may be output.

Incidentally, at least part of the above-described embodiments may be realized with a dedicated electronic circuit (that is, hardware) such as an IC (Integrated Circuit) on which a processor, a memory, or the like, are mounted. Further, at least part of the above-described embodiments may be realized by software (program) being executed. For example, the processing in the above-described embodiments can be realized by a processor (or processing circuit) such as a central processing apparatus (CPU: Central Processing Unit) and an image processing apparatus (GPU: Graphics Processing Unit) mounted on a computer apparatus being caused to execute programs using a general-purpose computer apparatus as basic hardware. In other words, the processor (or processing circuit) is configured to execute each processing of the gaze point estimation model generation apparatus 14, the gaze point estimation processing apparatus 16, or the like, by execution of the programs. Incidentally, a plurality of processors may be used.

For example, it is possible to implement the apparatus in the above-described embodiments by the computer reading out dedicated software stored in a computer readable storage medium. A type of the storage medium is not particularly limited. Further, it is possible to implement the apparatus in the above-described embodiments by the computer installing dedicated software downloaded via a communication network. In this manner, information processing using software is specifically implemented using hardware resources.

In some embodiments, at least one or more of the earning image data storage 141, detected gaze point image data storage 142, attribute data storage 143, and gaze point estimation model storage 161 may be implemented with EPROM, EEPROM, SDRAM, and flash memory devices, CD ROM, DVD-ROM, or Blu-Ray® discs and the like. In some embodiments, at least one or more of the learning image analyzer 144, gaze point estimation model generator 145, estimation image analyzer 162, gaze point estimator 163, image processor 164, image evaluator 165, gazed object deriver 166, and response generator 167 may be implemented with a circuit (e.g., circuitry of a FPGA, CPU, GPU or other processing circuits implemented using electronic circuits), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

Figure 13:
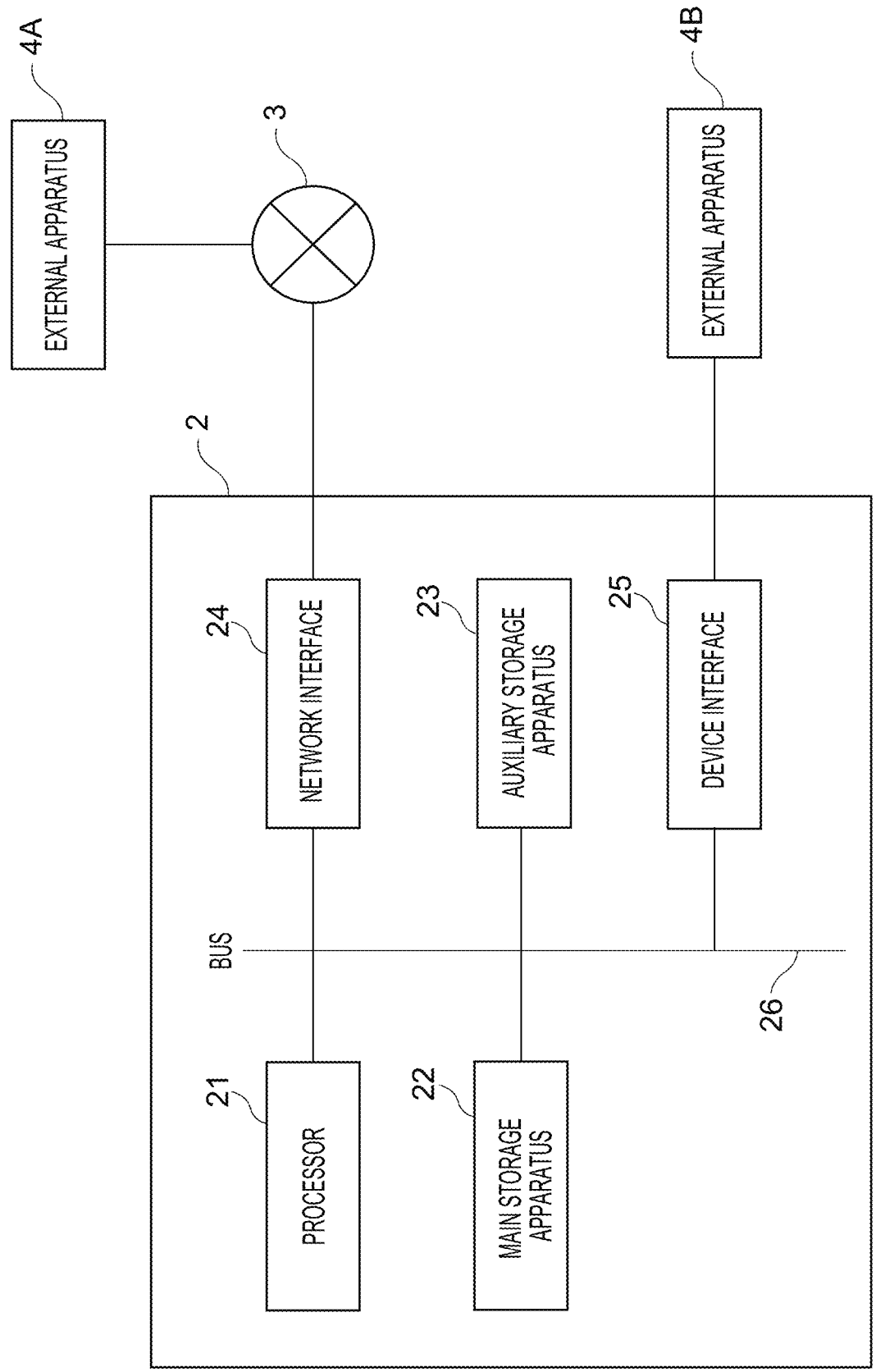
FIG. 13 is a block diagram illustrating an example of a hardware configuration in an embodiment of the present disclosure.

FIG. 13 is a block diagram illustrating an example of a hardware configuration in some embodiments of the present disclosure. The gaze point estimation model generation apparatus 14 and the gaze point estimation processing apparatus 16 may include a processor 21, a main storage apparatus 22, an auxiliary storage apparatus 23, a network interface 24 and a device interface 25, and can be realized as a computer apparatus 2 in which these are connected via a bus 26.

Incidentally, the computer apparatus 2 in FIG. 13 includes each and one of the components shown in FIG. 13. In some embodiments, the computer apparatus 2 may include a plurality of the same components. Further, while FIG. 13 illustrates one computer apparatus 2, software may be installed at a plurality of computer apparatuses, and each of the plurality of computer apparatuses may execute different part of processing of the software.

In some embodiments, at least one or more of the learning image display apparatus 11, gaze point detection apparatus 12, attribute data provision apparatus 13, estimation data provision apparatus 15, output destination apparatus 17 and sound data provision apparatus 18 may be implemented with the computer apparatus 2.

The processor 21 is an electronic circuit (or processing circuit) including a control apparatus and a calculation apparatus of the computer. The processor 21 performs calculation processing on the basis of data and a program input from each apparatus, or the like, of an internal configuration of the computer apparatus 2 and outputs a calculation result and a control signal to each apparatus, or the like. Specifically, the processor 21 controls respective components constituting the computer apparatus 2 by executing an OS (Operating System) of the computer apparatus 2, application, or the like. The processor 21 is not particularly limited if the processor 21 can perform the above-described processing. The image analyzers (the learning image analyzer 144 and the estimation image analyzer 162), the gaze point estimation model generator 145, the gaze point estimator 163, or the like, within the gaze point estimation model generation apparatus 14 and the gaze point estimation processing apparatus 16 are realized with the processor 21. Further, the processor 21 functions to output an estimated gaze point image, or the like, from the image for estimation when reading the gaze point estimation model.

The main storage apparatus 22 is a storage apparatus which stores a command, various kinds of data, or the like, to be executed by the processor 21, and information stored in the main storage apparatus 22 is directly read out by the processor 21. The auxiliary storage apparatus 23 is a storage apparatus other than the main storage apparatus 22. Incidentally, these storage apparatuses mean arbitrary electronic parts in which electronic information can be stored, and may be a memory or a storage. Further, while the memory includes a volatile memory and a non-volatile memory, either one may be used. The respective storages (e.g., the earning image data storage 141, detected gaze point image data storage 142, attribute data storage 143, and gaze point estimation model storage 161) within the gaze point estimation model generation apparatus 14 and the gaze point estimation processing apparatus 16 may be realized with the main storage apparatus 22 or the auxiliary storage apparatus 23.

The network interface 24 is an interface for connecting to the communication network 3 in a wireless or wired manner. As the network interface 24, one complying with existing communication standards may be used. It is possible to connect the computer apparatus 2 to an external apparatus 4A via the communication network 3 using the network interface 24.

The device interface 25 is an interface such as a USB which directly connects to an external apparatus 4B. That is, the computer apparatus 2 may be connected to the external apparatus 4 via a network or directly.

Incidentally, the external apparatus 4 (4A and 4B) may be each apparatus (e.g., the learning image display apparatus 11, gaze point detection apparatus 12, attribute data provision apparatus 13, estimation data provision apparatus 15, output destination apparatus 17 and sound data provision apparatus 18) other than the gaze point estimation model generation apparatus 14 and the gaze point estimation processing apparatus 16 or may be an external storage medium or may be a storage apparatus.

Incidentally, the external apparatus 4 may be an input apparatus. The input apparatus includes a device such as a keyboard, a mouse and a touch panel, and provides information input by these devices to the computer apparatus 2. A signal from the input apparatus is output to the processor 21.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

The invention claimed is:

1. A gaze point estimation processing apparatus comprising:
one or more storages configured to store a neural network; and
one or more processors configured to estimate information relating to a gaze point with respect to an image for estimation from the image for estimation using the neural network without inputting eye tracking information of a viewer of the image for estimation to the neural network,
wherein the information relating to the gaze point includes information relating to a probability that a pixel within the image for estimation is the gaze point.

2. The gaze point estimation processing apparatus according to claim 1, wherein
the one or more processors are further configured to calculate an optical flow on the image for estimation, and
the one or more processors are configured to estimate the information relating to the gaze point using the optical flow on the image for estimation.

3. The gaze point estimation processing apparatus according to claim 1, wherein the one or more processors are further configured to process the image for estimation on the basis of the information relating to the gaze point.

4. The gaze point estimation processing apparatus according to claim 1, wherein
the one or more processors are further configured to derive a gazed object of the viewer of the image for estimation based on the image for estimation and the information relating to the gaze point.

5. The gaze point estimation processing apparatus according to claim 4, wherein
the one or more processors are further configured to generate a response relating to the gazed object in a case where input data relating to the viewer includes information relating to the gazed object.

6. A gaze point estimation processing system comprising:
an imaging apparatus configured to capture an image; and
the gaze point estimation processing apparatus according to claim 1,
wherein the one or more processors are further configured to receive the image captured by the imaging apparatus as the image for estimation,
the one or more processors are further configured to transmit data relating to a position of the gaze point to the imaging apparatus, and
the imaging apparatus changes setting for photographing an object located on or around the position of the gaze point.

7. A gaze point estimation processing system comprising:
the gaze point estimation processing apparatus according to claim 1, wherein the one or more processors are further configured to receive an image captured by an imaging apparatus mounted on a mobile body as the image for estimation; and
a control apparatus configured to perform control so as to cause the mobile body to move on the basis of the gaze point estimated by the gaze point estimation processing apparatus.

8. The gaze point estimation processing apparatus according to claim 1,
wherein the information relating to the gaze point is an image relating to a probability that a pixel within the image for estimation is the gaze point.

9. The gaze point estimation processing apparatus according to claim 8,
wherein the image is at least one of a heat map, a contour map, or a three-dimensional graph.

10. A gaze point estimation processing method comprising:
acquiring, from one or more storages, a neural network; and
estimating, by one or more processors, information relating to a gaze point with respect to an image for estimation from the image for estimation using the neural network without inputting eye tracking information of a viewer of the image for estimation to the neural network,
wherein the information relating to the gaze point includes information relating to a probability that a pixel within the image for estimation is the gaze point.

11. The gaze point estimation processing method according to claim 10,
wherein the gaze point is estimated using an attribute of the viewer of the image for estimation.

12. The gaze point estimation processing method according to claim 10, further comprising:

processing, by the one or more processors, the image for estimation based on the information relating to the gaze point.

13. The gaze point estimation processing method according to claim 10,
wherein the information relating to the gaze point is an image relating to a probability that a pixel within the image for estimation is the gaze point.

14. The gaze point estimation processing method according to claim 13,
wherein the image is at least one of a heat map, a contour map, or a three-dimensional graph.

15. The gaze point estimation processing method according to claim 10, further comprising:
selecting, by the one or more processors, the neural network from a plurality of neural networks for different attributes of viewers, based on an attribute of the viewer of the image for estimation.

16. An evaluation method comprising:
generating, by one or more processors, an evaluation score by inputting a target image into a neural network,
generating, by the one or more processors, an image relating to a probability that a pixel within the target image is a gaze point estimated by the neural network without inputting eye tracking information of a viewer of the target image to the neural network, and
selecting, by the one or more processors, the neural network from a plurality of neural networks for different attributes of viewers, based on an attribute of the viewer of the target image,
wherein the generated image is at least one of a heat map, a contour map, or a three-dimensional graph.

17. The evaluation method according to claim 16,
wherein the attribute of the viewer is at least one of sex, age, hometown, address, occupation, family configuration, annual income, hobby, or a state.

18. A gaze point estimation processing apparatus comprising:
one or more storages configured to store a neural network; and
one or more processors configured to estimate information relating to a gaze point with respect to an image for estimation for the image for estimation using the neural network without inputting eye tracking information of a viewer of the image for estimation to the neural network,
wherein the one or more storages store a plurality of neural networks for different attributes of viewers,
the one or more processors are further configured to select, based on an attribute of the viewer of the image for estimation, the neural network from the plurality of neural networks.

19. A gaze point estimation processing apparatus comprising:
one or more storages configured to store a neural network; and
one or more processors configured to estimate information relating to a gaze point with respect to an image for estimation from the image for estimation using the neural network without inputting eye tracking information of a viewer of the image for estimation to the neural network,
wherein the one or more processors are configured to estimate the gaze point using an attribute of the viewer on the image for estimation.

20. A gaze point estimation processing apparatus comprising:

one or more storages configured to store a neural network; and one or more processors configured to estimate information relating to a gaze point with respect to an image for estimation from the image for estimation using the neural network without inputting eye tracking information of a viewer of the image for estimation to the neural network, wherein the one or more processors are further configured to evaluate the image for estimation based on of the information relating to the gaze point.

\* \* \* \* \*